Nov. 7, 1961   D. M. EVANS   3,007,453
CRADLE APPARATUS AND OPERATING MECHANISM
FOR POWER WASHING EQUIPMENT
Filed Feb. 29, 1960   4 Sheets-Sheet 2
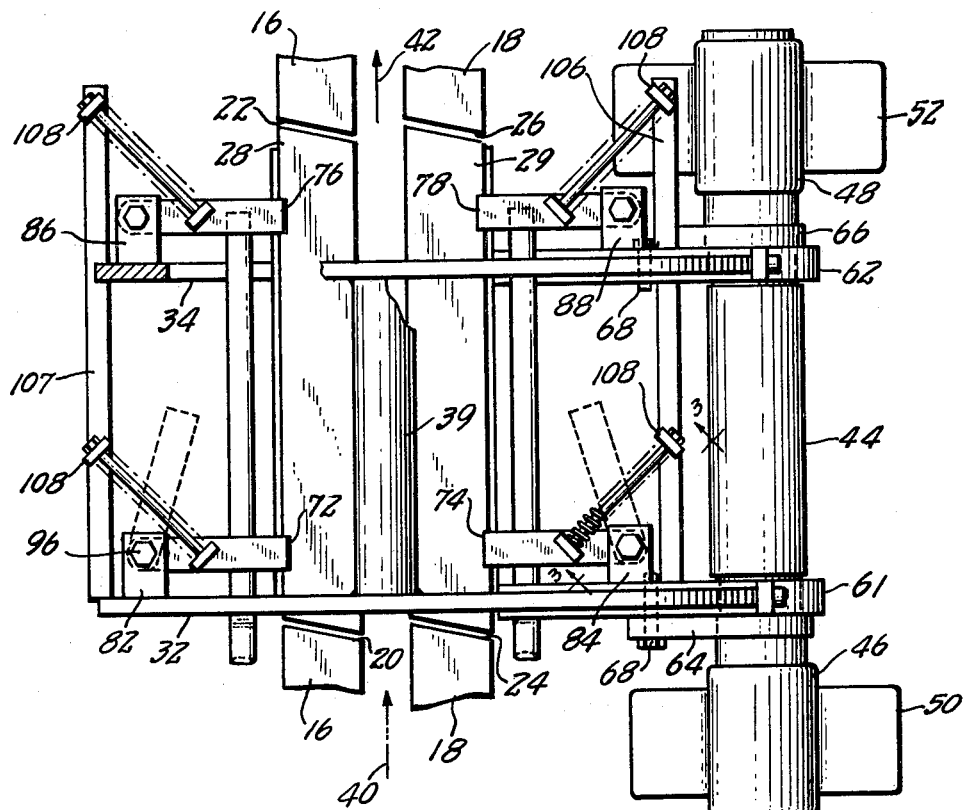
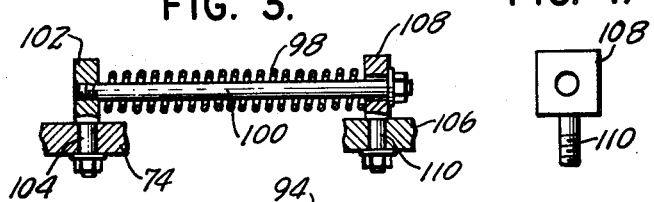
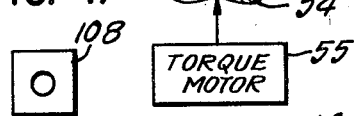
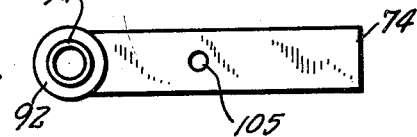
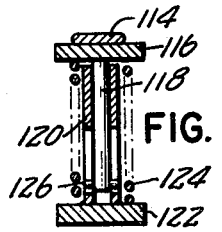
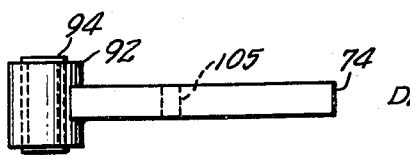
INVENTOR
DEWEY M. EVANS
BY
ATTORNEY Nov. 7, 1961 D. M. EVANS 3,007,453
CRADLE APPARATUS AND OPERATING MECHANISM
FOR POWER WASHING EQUIPMENT
Filed Feb. 29, 1960 4 Sheets-Sheet 3

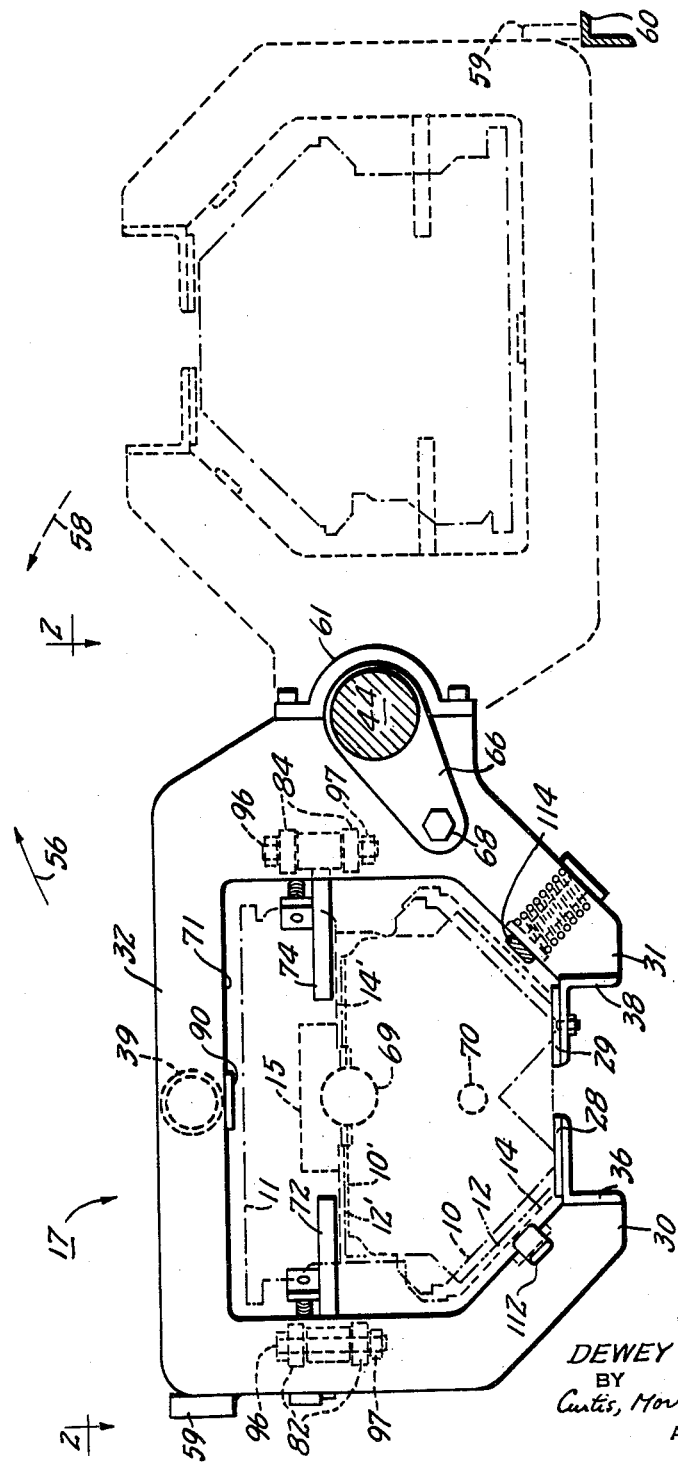

INVENTOR.
DEWEY M. EVANS
BY
Curtis, Morris & Safford
ATTORNEYS

Nov. 7, 1961  D. M. EVANS  3,007,453
CRADLE APPARATUS AND OPERATING MECHANISM
FOR POWER WASHING EQUIPMENT
Filed Feb. 29, 1960  4 Sheets-Sheet 4

INVENTOR.
DEWEY M. EVANS
BY
Curtis, Morris & Safford
ATTORNEYS

United States Patent Office 3,007,453
Patented Nov. 7, 1961

3,007,453
CRADLE APPARATUS AND OPERATING MECHANISM FOR POWER WASHING EQUIPMENT
Dewey M. Evans, Plymouth, Mich., assignor to Ajem Laboratories, Inc., Livonia, Mich.
Filed Feb. 29, 1960, Ser. No. 11,854
10 Claims. (Cl. 121—164)

The present invention relates to improved cradle apparatus and operating mechanism for use in power washing equipment adapted for industrial applications for cleaning various manufactured articles. This invention provides flexibility in the use of power washing equipment and advantageously enables a pair of pistons and cylinders to be used to provide accurately controlled torque for lifting and inverting heavy manufactured articles while protecting the articles from sudden jolts. This torque mechanism is able to operate effectively under heavy loads and operates smoothly in spite of suddenly changing torque loads. This invention is described as embodied in a machine for washing both the outside and the inside of fabricated metal parts or assemblies and various manufactured articles under the impact of high pressure jets of cleaning liquid.

The illustrative embodiment of this invention described herein is particularly well-suited for the automotive industry and similar heavy equipment mass-production industries wherein heavy complicated metal parts are automatically inverted during power washing operations. The improved cradle apparatus described herein is adapted to receive automobile engine blocks of different shapes and sizes and in different stages of assembly. The torque mechanism turns them over into an inverted position for efficient internal and external washing and flushing and then automatically returns the engine blocks to their initial positions.

It is an object of the present invention to provide improved cradle apparatus and to provide torque driving mechanism which is conveniently controlled for use in power washing equipment adapted for handling and inverting heavy manufactured articles.

In many mass-producing type industrial applications involving the fabrication of heavy, complicated machine parts and assemblies, there has been a marked trend toward the adaptation and use of automatic treating equipment such as power washing apparatus at one or more points in the production schedule to remove the various soil materials and foreign particles which accumulate on the manufactured article during the previous manufacturing steps. These soil materials often include such things as foundry sand, metal chips and filings, greases, cutting oils, and even coolant material and also various other dirt and dust particles. They must be thoroughly removed from the manufactured article before it can be assembled and operated.

For example, in high precision modern machinery, such as an automobile engine, the manufactured parts are held to very close tolerances and operate at extremely high pressure speeds so that the presence of only a slight amount of foreign substances quickly causes severe damage as a result of scouring and corrosive action when the engine is assembled and run. The manufacturers of such equipment are insisting upon power washing machines which will quickly and efficiently remove soil materials from the outsides and insides of the articles being cleaned.

The present invention is advantageous in enabling a power washing machine to handle heavy manufactured articles, such as automobile engine blocks, for it provides large torque forces which are readily controlled so as to move the heavy articles rapidly and smoothly during various washing operations.

As explained in Patent No. 2,918,071, heavy manufactured parts, such as automobile engine blocks to be cleaned often are supported in a desired position on a track in a power washing machine. These heavy articles are intermittently advanced along the track from position to position within the washing machine wherein they are subjected to high pressure jets of cleaning liquid impinging on the outside and inside surfaces of the articles at various angles in different positions assuring the most effective cleaning action. In this machine as described in said patent the automobile engine blocks pass in succession through a roll-over washing stage where high pressure sprays and streams of washing liquid are directed on them while they are revolved completely over around a horizontal axis back and forth several times. Then the blocks pass through an internal flushing stage where they are turned over approximately 180° from their initial position into a different position by means of special automatic cradle apparatus. Then, their various internal passages, for example, such as the oil passages and the passages for the hydraulic valve lift mechanism, are directly and forcefully flushed out by means of mandrels inserted lengthwise into the engine blocks through the crankshaft camshaft bearing openings. Jet forming orifices in the inserted mandrels are precisely aligned with these internal passages, and very high pressure jets of cleaning solution from these orifices then flush out these internal passages with a surging pressure.

In order to support the heavy articles and to rotate them over into positions for the various cleaning operations, the controllable torque apparatus described herein may be used to advantage in providing accurately and conveniently controlled movement in spite of heavy torque loads and in spite of rapidly changing torque loads.

The various aspects, features, objects and advantages of the present invention will be more fully understood from a consideration of the following description in conjunction with the accompanying four sheets of drawings, in which:

FIGURE 1 is an axial sectional view showing a cradle assembly at the left in its initial position and in dotted lines at the right in its inverted position. This cradle assembly is adapted to handle heavy articles and to move them about automatically for various kinds of treatment such as power washing;

FIGURE 2 is a top view looking down on the cradle assembly in its left position in FIGURE 1 taken along the line 2—2 in FIGURE 1;

FIGURES 3 and 4 are enlarged views showing details of automatic swingable locking arms in the improved cradle apparatus;

FIGURES 5 and 6 are a top view and elevational view, respectively, of the swingable locking arm;

FIGURE 7 is an enlarged sectional view of a spring actuated support in the improved cradle apparatus.

Figure 8:
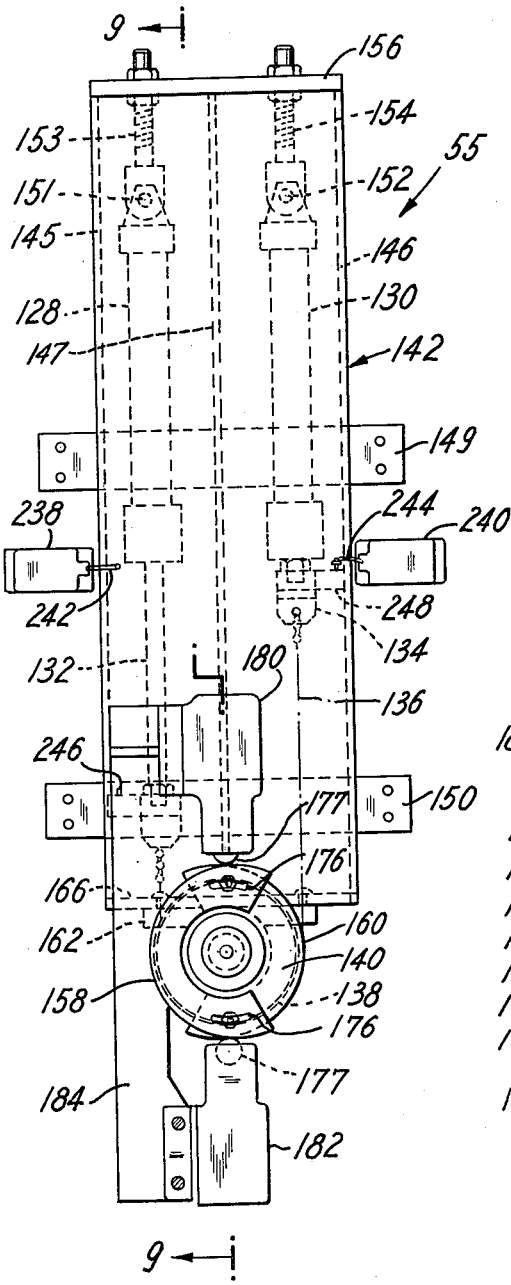
FIGURE 8 is a transverse sectional view of the torque operating mechanism for revolving the articles to be treated.

As illustrated in FIGURES 1 and 2, heavy manufactured articles, for illustration shown as automobile engine blocks of various sizes and shapes and in various stages of assembly, as indicated by dotted and dashed lines at 10, 11, 12, 14 and 15 are automatically handled by the improved cradle apparatus 17 shown. These blocks, for example, are generally of the V or so-called Y configuration and are intermittently transferred along main tracks 16 and 18 (FIGURE 2) extending throughout the length of the washing machine. As shown, the blocks are carried on the main tracks 16 and 18 in inverted positions, that is, with the banks of cylinders extending downwardly. However, it is to be understood that in various other machines, depending upon the particular manufacturing operations, the articles to be washed may be carried in their upright positions. The main tracks are interrupted at 20, 22, 24 and 26, respectively. These main tracks are cut off on a diagonal, and short track segments 28 and 29 are adapted to be positioned between these diagonal cuts with a slight amount of clearance at each end.

As shown in FIGURE 1, the track segment 28 is supported by an angle bracket 36 so as to extend between the respective extreme outer arms 30 of the generally C-shaped cradle frame members 32 and 34. The bracket 36 has one leg secured to the inner faces of the arms 30 of the frame members 32 and the other leg projecting across toward the opposed arms 31 of these frame members 32 and 34. Similarly, the track segment 29 is carried by an angle bracket 38 so as to extend between the ends of the arms 31. These track segments 28 and 29 are similarly cut off at an angle so as to match with the adjacent ends of the main tracks 16 and 18, effectively forming extensions of these tracks when the cradle members 32 and 34 are in their initial position at the left in FIGURE 1. Extending between the frame members 32 and 34 is a main brace 39 formed by a large diameter pipe rigidly welded in position between these members.

In operation, the engine blocks 10, 11, 12, 14 or 15, as the case may be, are advanced in succession along the tracks 16 and 18 in the direction of the arrow 40. These blocks are loaded one at a time into the cradle through the C-shaped opening between the arms 30 and 31. In order to slide the blocks along the tracks 16 and 18 and to load them into the cradle, a transfer mechanism (not shown) is located below and generally between the tracks. This transfer mechanism includes block-engaging dogs which extend up between the tracks so as to engage the rear ends of the blocks as they sit on the tracks. These dogs are moved forward by the transfer mechanism an appropriate distance in the direction of the arrow 40 so as to advance all of the blocks the desired distance along the tracks. Then the dogs disengage from the blocks and are returned to their initial positions where they each engage the next successive block. As will be understood from a study of FIGURE 1, the space between the tracks 16 and 18 and also between the track segments 28 and 29 provides clearance for the transfer dogs to come up and engage the engine blocks in advancing them along the tracks and in loading them onto the cradle assembly as indicated by the arrow 40 and later in unloading them from the cradle assembly in the direction of the arrow 42. Then the next successive block on the tracks is loaded into the cradle, and so forth.

The frame members 32 and 34 are parallel and rigidly secured to a main shaft 44, which is rotatably supported in a pair of main bearings 46 and 48 carried on supports 50 and 52, respectively. An extension portion 54 of the main shaft 44 is secured to a suitable source of torque, indicated schematically in block form as a torque motor 55, which is shown in FIGURES 8-11. This torque apparatus is precisely controlled and provides sufficient force to swing the cradle assembly smoothly up over the main shaft 44 as indicated by the arrow 56 into the inverted position at the right in FIGURE 1. Then later on the torque motor swings it back again in the direction of the arrow 58 to its initial position. This torque motor is highly effective for this use and includes a pair of hydraulic cylinders 128 and 130 and pistons and rods 132 and 134 respectively, arranged side by side and operating a chain 136 passing in a U-turn 138 around a sprocket 140 on the shaft 54. These pistons 132 and 134 move the chain so as to turn the sprocket and shaft 54 through an angle of 180°. There are cams on the shaft 54 which operate flow control valves so as to control the operation of the cylinders 128 and 130 as is explained in detail hereinafter. Stocks 59 on the ends of the frame members 32 and 34 rest on suitable abutments 60 when the cradle is inverted.

Securing the frame members 32 and 34 to the shaft 44 are a pair of semi-circular brackets 61 and 62, respectively. To assure that the cradle assembly is rigidly turned by the shaft 44, a pair of lever arms 64 and 66 are welded to the shaft adjacent to the positions of the straps 60 and 62 and are bolted to the frame members 32 and 34 by the bolts 68.

When the cradle is in its inverted position at the right in FIGURE 1, the engine block is upright and in position for suitable cleaning or drying operations to be performed quickly and efficiently. This cleaning operation is carried out by precisely positioned jets which direct high pressure streams of cleaning fluid at and into the parts of the block to be cleaned. In certain instances as an alternative or supplemental arrangement to flush out the passages in the blocks, mandrels (not shown) are inserted into them through the crankshaft and cam shaft bearing openings 69 and 70, respectively. Flushing mandrels of this type are explained in detail in said patent.

In order, advantageously, to accommodate various sizes and shapes of engine blocks such as those indicated at 10, 11, 12, 14 and 15, the C-shaped frame members 32 and 34 have an extensive vertical opening 71 providing a higher clearance therein. As shown near the center at the left in FIGURE 1, the three various types of blocks 10, 12 and 14 do not yet have their bearing caps assembled onto them. These blocks have different shapes, but they all have flat bottom surfaces 10′, 12′ and 14′ which are approximately in line with the axis of the crankshaft opening 69.

In order to engage these flat bottom surfaces 10′, 12′ and 14′ of the blocks, four swingable locking arms 72, 74, 76, and 78, are mounted by brackets 82, 84, 86 and 88, respectively on the arms 30 and 31 of the frame members 32 and 34, on opposite sides of the opening 71. These swingable locking arms are mounted at such height that in their extended positions they just clear the surfaces 10′, 12′, and 14′. When the cradle is inverted these locking arms 72, 74 and 76, and 78 rigidly support the blocks in their proper positions in the cradle 17. When a block with a clutch housing 89 already assembled thereon, such as the block 11, is being loaded into the cradle 17, the clutch housing temporarily pushes these swingable locking arms aside to allow the clutch housing to pass between them. These arms are then returned toward their initial inner positions by means of springs explained below. After the clutch housing passes, each arm swings in and engages over the pan rail or other surface suitable for supporting the block and clutch housing when the cradle is inverted. This block and clutch housing assembly is thus accurately supported in the desired position in the cradle by means of these spring-returned arms as the cradle is swung up and over into an inverted position which is 180° reversed from its initial position and then swung back again.

Between the frame members 32 and 34 extends a flat brace 90 centrally located with respect to the blocks as they are supported in the cradle, which may be used in certain instances for auxiliary support.

The four swingable locking arms 72, 74, 76 and 78 are identical except that the arms 72 and 76 are at the left of the cradle opening and adapted to be swung back to the left, while the arms 74 and 78 swing back to the right. The construction of the arm 74 is shown in detail in FIGURES 3, 4, 5 and 6. This arm is welded to a collar 92 which houses a sleeve bearing 94 that pivots on a bolt 96 extending between both sides of the U-shaped bracket 84 and secured by a suitable lock nut 97, as will be understood. The sleeve bearing 94 is snugly straddled by the two sides of the bracket. To urge the arm 72 toward its inner or block supporting position, a compression spring 98 is mounted on a long sliding bolt 100. The threaded end of this sliding bolt is screwed into a swivel block 102 having a shank 104 pivoted in a hole 105 about mid-way along the arm 74.

When the arm 72 is swung back, the other end of the bolt 100 slides through a bearing block 108 having a shank 110 pivoted in a hole in a spring mounting bar 106 which extends between the sides of the arms 31. The rear end of this spring mounting bar extends back behind the frame member 34 so as to carry the corresponding bearing block 108 for the arm 78. A similar spring mounting bar 107 extends between the arms 30 and carries the corresponding sliding bolt bearing blocks 108 for the arms 72 and 76.

When the types of blocks having the small bearing caps 15 are loaded into the cradle 17, this small bearing cap passes between the free ends of the arms 72 and 74 as the block is loaded. Thus, these arms remain in their extended positions ready to support the block as the cradle is swung up and over.

In order to aid in centering the blocks in the cradle 17, a pair of spring loaded guide bars 112 and 114 extend between the respective inner surfaces of the arms 30 and 31 in position to engage underneath the head surfaces of the two banks of cylinders. The front ends of these guide bars are bent down at about a 30° angle ahead of the frame member 32 to facilitate the motion of the blocks onto these guide bars. At each end these guide bars are fastened to movable plates 116 (see FIGURE 7) having pins 118 extending down into sleeves 120 secured by brackets 122 to the respective frame members 32 and 34. A compression spring 124 surrounds the sleeve 120 and thrusts up against the plate 116 so as to receive part of the weight of the engine blocks and help to hold them in position in the cradle. A transverse pin 126 projecting into a longitudinal slot in the sleeve 120, as shown, retains this spring assembly in position.

Figure 9:
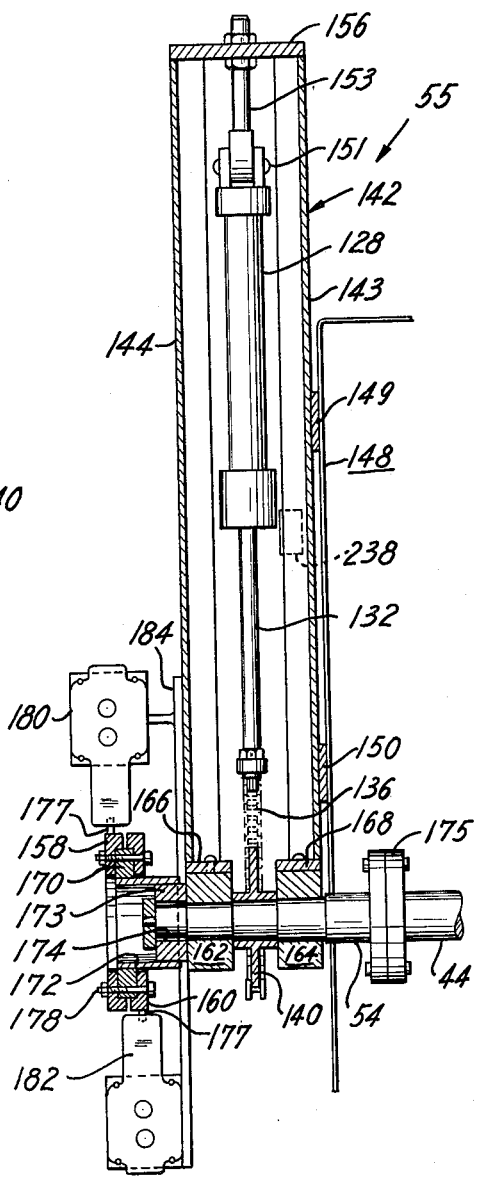
FIGURE 9 is an elevational sectional view taken generally along the line 9—9 looking toward the left.

As shown in FIGURES 8 and 9, the torque drive apparatus 55 is mounted within an upright housing 142 formed by a pair of spaced parallel cover plates 143 and 144 which are joined by a pair of side plates 145 and 146. For added strength, a vertical web plate 147 extends between the two cylinders 128 and 130, thus dividing the housing into two compartments. The housing is secured to the main frame 148 of the machine by means of the brackets 149 and 150. At the lower end of the housing 142 are a pair of bearings 162 and 164 which are closely adjacent to the sprocket 140. The shaft 54 is journaled in these bearings so as to withstand the large forces applied by the chain 136 to the sprocket 140. Thus, deflection of the shaft 54 is prevented. These bearings 162 and 164 are shown as being mounted in pillow blocks secured to a pair of bottom plates 166 and 168, respectively, at the bottom of the housing.

In order to support the cylinders 128 and 130 so as to allow the piston rods 132 and 134 to align themselves with the line of pull of the chain 136, pivoted clevis connections 151 and 152 are made to a pair of adjustment bolts 153 and 154, respectively. The shanks of these bolts pass up through holes in the top plate 156 of the housing and are held by nuts as shown.

For purposes of controlling the torque output and the acceleration and deceleration of the cradle 17 as it swings the heavy loads up and over into inverted position, there are two arcuate cams 158 and 160 which are clamped in adjustable position against opposite faces of a disc mounting 170. This disc mounting 170 has an axial sleeve 172 with an annular internal shoulder 173 for mounting on the end of the shaft 54. A keyed connection 174 holds the shoulder 173 and the sleeve in fixed position on the shaft 54; and this shaft 54 is coupled to the main shaft 44 by a suitable coupling 175.

The arcuate cams 158 and 160 each have an identical C-shaped configuration and each includes a pair of arcuate slots 176, as seen in FIGURE 8. The cams 158 are reversed in operating position and are clamped onto the disc 170 by means of suitable adjusting bolts 178 (FIGURE 9) passing through the slots 176 and through holes in the disc 170. The respective outer cylindrical surfaces of these cams are used to actuate cam following rollers 177 at the inner ends of push rods of a pair of opposed hydraulic flow control valves 180 and 182. It is the function of these valves to control the acceleration and deceleration of the piston rods 132 and 134 at the respective ends of their strokes. These flow control valves are fastened to the opposite ends of a vertical brace 184 secured to the cover plate 144 of the housing 142. It will be understood that these flow control valves 180 and 182 include springs which continuously urge their cam-followers against the respective cams.

In order to provide maximum velocity at the mid-position of each stroke, the cylindrical cam surfaces have a minimum radius at their mid points, as shown in FIGURE 8, smoothly increasing to a maximum radius toward both ends. Thus, the respective cam followers 177 are in their most extended positions when engaging the mid-points of the cams and so the valves 180 and 182 are substantially wide open during the mid-stroke of the piston rods 132 and 134. These valves are progressively and smoothly closed as the end of the stroke approaches.

Figure 10:
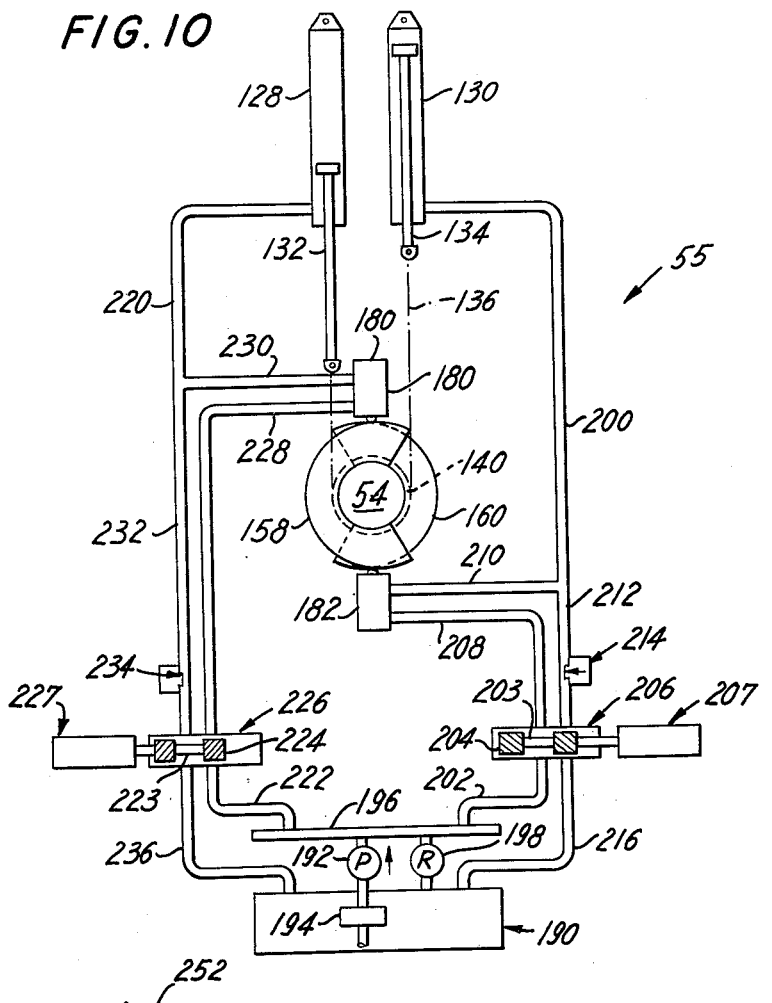
FIGURE 10 is a diagram, partially schematic, illustrating the hydraulic control mechanism.

As shown in FIGURE 10, a tank 190 is used as a reservoir for the hydraulic liquid which drives the pistons and rods 132 and 134. The liquid is drawn up by a pump 192 from the reservoir 190 through a strainer 194 and is fed under pressure to a main supply line 196. A pressure regulating valve 198 limits the pressure in the main supply line 196 and allows any excess liquid to return directly to the reservoir 190.

In order to explain the operation it is assumed that the piston rod 134 has been pulling on the chain 136 and has been turning the shaft 54 in a counter-clockwise direction as seen in FIGURES 8 and 10. The hydraulic fluid has been flowing into the lower end of the cylinder 130 through a line 200. The circuit for this fluid to the line 200 can be traced from the main line 196 through a supply line 202, and through the open space 203 of a slide bar 204 of a solenoid-operated valve 206 having a control solenoid 207. From the valve 206 the fluid passes through a line 208 to the acceleration and deceleration control valve 182 and then through a line 210 which joins the line 200.

There is also a return line 212 including an adjustable spring-biased restriction device 214 which extends from the junction of lines 210 and 200 back to the control valve 206. With the slide bar 204 in its extended position, as shown in FIGURE 10, this return line 212 is blocked, and thus no liquid can return through a sump line 212 to the reservoir 190.

While the piston rod 134 has been rising, the other piston rod 132 has been descending and the fluid has been flowing out from the cylinder 128 through a line 220 and a return line 232, passing through an adjustable restriction device 234, to the open space 223 in a side-bar 124 of a solenoid-operated valve 226. The slide-bar 224 is in its retracted position, and thus the liquid has been allowed to flow through a sump line 236 back to the reservoir 190.

The purpose of the adjustable spring-biased restriction devices 214 and 234 is to inhibit the flow of liquid out of the respective cylinders as the respective piston rods are descending. In this way a suitable tension is maintained on the portion of the chain 136 which is opposite to that through which the driving torque is being applied to the sprocket 140. Consequently, the V-bend of the chain is always being pulled into firm engagement with the teeth of the sprocket regardless of which direction the shaft 54 is being turned. Moreover, these restriction devices 214 and 234 are adjusted to have sufficient spring pressure to prevent the fluid from draining out of either cylinder until the piston in the other begins its upward drive, thus pulling down on the idle piston rod so as to force the restriction device open.

It will be appreciated that the control valve 182 served to control the rate of supply through the lines 210 and 200 to the cylinder 130 while the piston rod 134 was being driven up. Accordingly, a smooth acceleration and deceleration was provided for the carriage 17. The slide bar 224 of the control valve 226 blocks off the supply line 222 while the piston rod 132 is descending. Thus, the restriction 234 is allowed to provide full control over the tension force applied by the piston rod 132 to the chain.

Conversely, when the piston rod 132 is rising, the acceleration and deceleration control valve 180 controls the torque applied, and the restriction device 214 controls the tension in the opposite portion of the chain 136.

Figure 11:
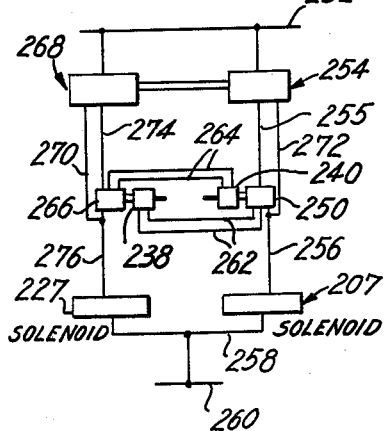
FIGURE 11 is a schematic circuit diagram showing the electrical connections.

In order to actuate the solenoids 207 and 227 an electrical control circuit is utilized as shown in FIGURE 11 including a pair of limit switches 238 and 240, as seen also in FIGURES 8 and 9. Each of these switches has an actuating arm 242 and 244, respectively, which are adapted to be engaged by adjustable stops 246 and 248, respectively, carried by the lower ends of the two piston rods.

As the piston rod 134 rises up to the top of its stroke, the switch arm 244 is raised. This closes a pair of contacts within the switch 240 so as to close a lock-in relay 250 to energize the solenoid 207 to retract the slide bar 204. This energizing circuit can be traced from an electrical power main 252 through a main timer control switch 254, through a wire 255, and through the lock-in relay 250 and a wire 256 to the solenoid 207, and then through a wire 258 to the other electrical power main 260. The main control switch 254 is tied in with the operation of the remainder of the machine, as will be understood, and maintains a proper timed relationship between the operation of the torque apparatus 55 and the other machine parts. The holding circuit 262 for the lock-in relay includes a pair of contacts in the other switch 238 for reasons which will be explained.

Upon raising the switch arm 244 of the switch 240 another pair of contacts in the switch 240 are opened so as to open the holding circuit 264 of a lock-in relay 266 controlling the solenoid 227. However, a main timer control switch 268 maintains the solenoid 227 energized for a brief period longer through a wire 270 which by-passes the lock-in relay 266. At the appropriate moment the solenoid 227 is deenergized by the opening of the timer switch 268 and so the piston rod 132 begins driving upwardly. When the switch arm 242 of the switch 238 is actuated, this energizes the solenoid 227 through leads 274 and 276. Also, when the switch 238 is actuated, then the holding circuit 262 is opened. However, the timer switch 254 now maintains the solenoid 207 energized through a wire 272 which by-passes the lock-in relay 250.

The electrical control circuit is shown by way of example, and it will be appreciated that other convenient arrangements can also be used, as will be apparent to those skilled in the art. For example, two pair of limit switches may be used with each of the piston rods at respective opposite ends of their strokes, so as to control the energization and deenergization of solenoids 207 and 227.

As used herein the term "inverted position" is intended to mean a position in which the cradle and articles in the cradle are turned over approximately 180° from their initial position, regardless of the fact that the articles may initially be upside down with respect to their normal position in use.

Thus, this improved apparatus readily accommodates a wide variety of heavy loads and is conveniently and accurately controlled. The piston rods advantageously operate under tension, not compression, when supplying driving power thus maintaining precise alignment.

From the foregoing description it will be understood that the improved cradle apparatus and torque operating mechanism of the present invention are well adapted to provide the many advantages discussed above, and that this torque mechanism can be adapted for a wide variety of industrial applications suited for use with many different types of manufactured articles, and that various changes or modifications may be made therein each as may be best suited to a particular application, and that the scope of the present invention, as defined by the following claims is intended to include such modifications or adaptations limited only by the prior art.

This application is a continuation-in-part of my prior copending application Serial No. 578,939, filed April 18, 1956, now Patent No. 2,926,675, granted March 1, 1960.

I claim:

1. Controllable torque apparatus for rotating a parts-holding fixture through a pre-determined angle and then for returning the fixture to its original position comprising a pair of hydraulic cylinders having pistons therein with piston rods extending therefrom, a sprocket adapted to be connected to the fixture to be rotated, a chain engaging said sprocket and having its opposite ends connected to each of said piston rods, a source of hydraulic fluid under pressure, a pair of flow-control valves connected between said source and respective ones of said cylinders, and cams effectively connected to said sprocket for controlling said valves, said cams retarding the flow through said flow-control valves as said pistons near the respective end of their strokes.

2. Controllable torque apparatus as claimed in claim 1 and wherein said pistons are in spaced parallel connections and said chain passes in a U-turn around said sprocket.

3. Controllable torque apparatus as claimed in claim 1 and wherein said cams are identical but are faced effectively in opposite directions, whereby one of said cams controls clockwise movement of the sprocket and the other controls counter-clockwise movement thereof.

4. Controllable torque apparatus as claimed in claim 1 and wherein said cams have generally C-shaped cylindrical cam surfaces with a minimum radius at the mid-position of each cam surface rising smoothly to a larger radius at each end.

5. Controllable torque apparatus as claimed in claim 1 wherein the end of each cylinder opposite to that from which the piston rod extends is pivotally connected to a mounting structure, whereby the two cylinders automatically align themselves with the line of pull of the chain.

6. A torque motor for rotating a shaft through a pre-determined angle about its axis and then for returning the shaft to its original position comprising a sprocket mounted on said shaft, a pair of bearings closely adjacent to opposite sides of said sprocket in which said shaft is journaled, a rigid frame connected to said bearings, a pair of hydraulic cylinders in spaced parallel relationship mounted on said frame and each having a piston therein and a piston rod extending from a corresponding end thereof, said cylinders each being pivotally connected to said frame at their ends opposite to those from which the piston rods extend, a chain having its opposite ends connected to said piston rods and passing a U-turn around said sprocket, and hydraulic fluid supply means for supplying hydraulic fluid under pressure alternatively to one and then to the other of said cylinders, said fluid being supplied to the piston-rod side of each of said pistons, whereby said piston rods are alternatively operated under tension.

7. A torque motor for rotating a shaft through a pre-determined angle about its axis and then for returning the shaft to its original position comprising a sprocket mounted on said shaft, a pair of bearings closely adjacent to opposite sides of said sprocket in which said shaft is journaled, a rigid frame connected to said bearings, a pair of hydraulic cylinders in spaced parallel relationship mounted on said frame and each having a piston therein and a piston rod extending from a corresponding end thereof, said frame providing a vertical housing surrounding said cylinders and piston rods with said bearings being connected to a lower portion of said housing, the upper ends of said cylinders being pivotally connected to adjustment bolts secured to the top of said housing, a chain having its opposite ends connected to said piston rods and passing in a U-turn around said sprocket, and hydraulic fluid supply means for supplying hydraulic fluid under pressure alternatively to one and then to the other of said cylinders, said fluid being supplied to the piston-rod side of each of said pistons, whereby said piston rods alternatively operated under tension.

8. A controllable torque motor for rotating a heavily-loaded shaft through a predetermined angle about its axis and then for returning it to its initial position comprising an upright housing having a pair of cylinders pivotally mounted at their upper ends within the housing, said cylinders hanging down in spaced parallel relationship within said housing, a piston rod depending from the lower end of each cylinder, a pair of bearings for the shaft mounted on a lower portion of said housing, a sprocket secured to said shaft between said bearings, a chain having its opposite ends secured to said piston rods and passing in a U-bend beneath said sprocket with said U-bend engaging said sprocket, a source of hydraulic fluid under pressure, hydraulic circuit means connecting said source to the lower end of each of said cylinders beneath the pistons therein, a pair of flow control valves, one of said valves being interposed in the hydraulic circuit to each cylinder, each of said valves having an actuating rod, a pair of cams mounted on said shaft, said actuating rods following said cams, said cams opening said valves when the shaft is in its intermediate position and progressively closing said valves as said shaft nears the limit of its turn in either direction.

9. A controlable torque motor as claimed in claim 8 and wherein said cams have cylindrical cam surfaces and a C-shaped configuration, said cams being mounted on said shaft with their cylindrical surfaces facing in opposite directions and said valves being on opposite sides of said shaft.

10. A controllable torque motor as claimed in claim 9 wherein the shaft turns 180°.

References Cited in the file of this patent
UNITED STATES PATENTS

| | | |
|---|---|---|
| 1,696,044 | Kuskin | Dec. 18, 1928 |
| 1,935,014 | Burdick et al. | Nov. 14, 1933 |
| 2,312,122 | Parker et al. | Feb. 23, 1943 |
| 2,560,285 | Habenicht | July 10, 1951 |